United States Patent Office 3,335,085
Patented Aug. 8, 1967

3,335,085
INHIBITING CORROSION BY ACIDS
John J. Hronas, Greentree Borough, Pa., assignor to Calgon Corporation
No Drawing. Filed Apr. 8, 1964, Ser. No. 358,377
1 Claim. (Cl. 252—82)

This invention relates to the inhibition of corrosion of steel by aerated muriatic acid, aerated hydrochloric acid, and aerated solutions of hydrochloric acid mixed with other acids such as sulfuric, hydrofluoric, and phosphoric acids. More particularly, it relates to the use of mercaptobenzothiazole (MBT) to inhibit corrosion in the presence of such aerated acid solutions.

Strong acid solutions have long been used to dissolve scale, particularly calcium carbonate scale, deposited on cooling towers and the metal surfaces of other apparatus and equipment in water systems. Such systems are designed to handle circulating water for cooling purposes and are treated with an acid solution which generally must be circulated. The circulation causes aeration which renders most corrosion inhibitors virtually ineffective. MBT is relatively unaffected by aeration.

It is a common problem in the cleaning of scale from small cooling towers and the like, that the acid solutions normally used, whether inhibited or not, tend to remove and dissolve copper from copper surfaces and redeposit them on steel surfaces. The presence of dissolved copper in the system is highly undesirable since it tends to plate out and cause severe galvanic attack of steel surfaces.

My invention overcomes the disadvantages of the plating out of copper on steel mainly by maintaining the copper in a complex with the MBT, rather than by preventing the attack of acid on copper to a great degree. As a matter of fact, the copper-MBT complex appears to be a better inhibitor in aerated hydrochloric acid than is the MBT alone.

Thus it may be said that my invention comprises the inhibition of corrosion of steel by aerated acid solutions by adding to the acid solutions a small amount of mercaptobenzothiazole. By an aerated acid solution, I mean one which is subject to more or less vigorous contact with air in at least one point so that at least that point is essentially saturated with air.

The MBT may be added to the strong acid solution before it is injected into the circulating water. Or, it may be added in the dry form to the circulating water prior to addition of the acid or after addition of the acid to attain at least about 1 part MBT per million parts pickling solution.

In the preferred practice, about 0.10 to about 0.40 gram of MBT are added to a 24% solution of muriatic acid, for example. The addition is preferably made by first preparing a dilute solution of MBT in a polar solvent such as isopropanol or a mixture of isopropanol and water, and this solution is added to the strong acid solution. For example, one milliliter of a 0.240 g./liter solution of MBT may be added to 24% muriatic acid to obtain an acid solution containing 240 p.p.m. of MBT.

The strong acid solution thus prepared may then be added to the aerated water system in amounts normally used to remove scale and the like. Such amounts are usually, in the case of muriatic or hydrochloric acid, for example, about ¼% to about 5% by weight based on pure acid.

In the final solution, strengths of MBT may be about 1 to about 1000 parts by weight per million parts by weight of aerated acid solution, even solutions containing as high as 50% acid.

The following tables demonstrate the effectiveness of my invention. In each table 1½" square steel and/or copper panels were used where indicated at room temperature. The panels were suspended in the solution and put under slight agitation. The solutions were aerated where indicated. The solutions including MBT were made by dissolving them in a water-alcohol mix and then adding the acid to this mixture.

1½" x 1½" steel and copper panels were placed in the solutions of Table I for two hours at room temperature. The solutions were aerated.

Table I

| 250 p.p.m. MBT in 44% HCl (percent weight/volume): | Weight lost (g.) |
|---|---|
| Steel panel alone | 1.5606 |
| Copper and steel panels in same solution, not coupled— | |
| Copper | .0322 |
| Steel | .1880 |
| Copper and steel, coupled— | |
| Copper | .0051 |
| Steel | .2853 |
| 0 p.p.m. MBT in 44% HCl: | |
| Steel panel alone | 1.9162 |
| Copper and steel panel in same solution, not coupled— | |
| Copper | .0583 |
| Steel | .8991 |
| Copper and steel panel, coupled— | |
| Copper | .0501 |
| Steel | .3609 |

1½" x 1½" steel panels were placed in the solutions of Table II for two hours. The solutions were aerated.

Table II

| Treatment: | Wt. lost (g.) |
|---|---|
| 10% HCl+ 0 p.p.m. MBT | .0364 |
| 10% HCl+10 p.p.m. MBT | .0166 |
| 10% HCl+20 p.p.m. MBT | .0093 |
| 10% HCl+30 p.p.m. MBT | .0073 |
| 10% HCl+50 p.p.m. MBT | .0069 |
| 10% HCl+57 p.p.m. MBT | .0064 |

1½" x 1½" steel and copper panels were placed in the solutions of Table III for two hours. The solutions were aerated.

Table III

| Treatment: | Wt. lost (g.) |
|---|---|
| 2½% HCl+0 p.p.m. MBT— | |
| Steel panel alone | .0157 |
| Copper and steel panel in same solution, not coupled— | |
| Copper | .0026 |
| Steel | .0184 |
| Copper and steel panel, coupled— | |
| Copper | 0 |
| Steel | .0166 |
| 2½% HCl+11.75 p.p.m. MBT— | |
| Steel panel alone | .0086 |
| Copper and steel panel in same solution, not coupled— | |
| Copper | .0018 |
| Steel | .0080 |
| Copper and steel, coupled— | |
| Copper | 0 |
| Steel | .0125 |

1½" x 1½" steel and copper panels were placed in the solutions of Table IV for two hours. The solutions were aerated.

Table IV

| Treatment: | Wt. lost (g.) |
|---|---|
| 5% HCl+0 p.p.m. MBT— | |
|   Steel panel alone | .0183 |
|   Copper and steel in same solution, not coupled— | |
|     Copper | .0029 |
|     Steel | .0149 |
|   Copper and steel, coupled— | |
|     Copper | .0001 |
|     Steel | .0179 |
| 5% HCl+23.5 p.p.m. MBT— | |
|   Steel panel alone | .0090 |
|   Copper and steel in same solution, not coupled— | |
|     Copper | .0002 |
|     Steel | .0035 |
|   Copper and steel, coupled— | |
|     Copper | .0002 |
|     Steel | .0100 |

Results presented in Tables I–IV may be compared to the results of Table V which shows the effect of aeration on a conventional corrosion inhibitor, N-dibutylthiourea. 1½″ x 1½″ steel panels were placed in the solutions of Table V for 24 hours.

Table V

| Treatment: | Wt. lost (g.) |
|---|---|
| Stagnant— | |
|   1 N HCl+0% N-dibutylthiourea | .6481 |
|   1 N HCl+.0005% N-dibutylthiourea | .0287 |
|   1 N HCl+.001% N-dibutylthiourea | .0224 |
|   1 N HCl+.005% N-dibutylthiourea | .0168 |
|   1 N HCl+.01% N-dibutylthiourea | .0160 |
|   1 N HCl+.05% N-dibutylthiourea | .0163 |
| Aerated— | |
|   1 N HCl+0% N-dibutylthiourea | .3684 |
|   1 N HCl+.0005% N-dibutylthiourea | .2761 |
|   1 N HCl+.001% N-dibutylthiourea | .1478 |
|   1 N HCl+.005% N-dibutylthiourea | .1488 |
|   1 N HCl+.01% N-dibutylthiourea | .1702 |
|   1 N HCl+.05% N-dibutylthiourea | .1871 |

It will be seen from Table V that aeration is very detrimental to the inhibiting action of N-dibutylthiourea. MBT is not so affected.

I do not intend to be limited to the above specific examples and illustrations of my invention. It may be otherwise variously practiced within the scope of the following claim.

I claim:

In a method of removing calcium carbonate scale from an aerated circulating water system by adding ¼% to about 5% hydrochloric acid by weight of the water to said water system, the improvement comprising inhibiting the corrosive tendencies of the hydrochloric acid by adding to said system about one part to about 1000 parts mercaptobenzothiazole per million parts water in said system.

References Cited

UNITED STATES PATENTS

| | | | |
|---|---|---|---|
| 1,671,627 | 5/1928 | Chamberlain | 252—150 |
| 1,756,311 | 4/1930 | Semon | 252—150 |
| 2,742,369 | 4/1956 | Hatch | 252—131 X |

OTHER REFERENCES

Drane: "Water Treatment for Recirculating Systems," Chemistry and Industry, Nov. 24, 1956, pp. 1367–1371.

LEON D. ROSDOL, *Primary Examiner.*

W. E. SCHULZ, *Assistant Examiner.*